Aug. 31, 1965           E. K. FULLER           3,204,179
TEST CIRCUIT FOR DETERMINING IMPEDANCE AND RELATED
CHARACTERISTICS OF AN ELECTRICAL ELEMENT
INCLUDING TRANSISTOR MEANS OPERATED
WITH ZERO COLLECTOR-TO-BASE VOLTAGE
Filed Nov. 25, 1959
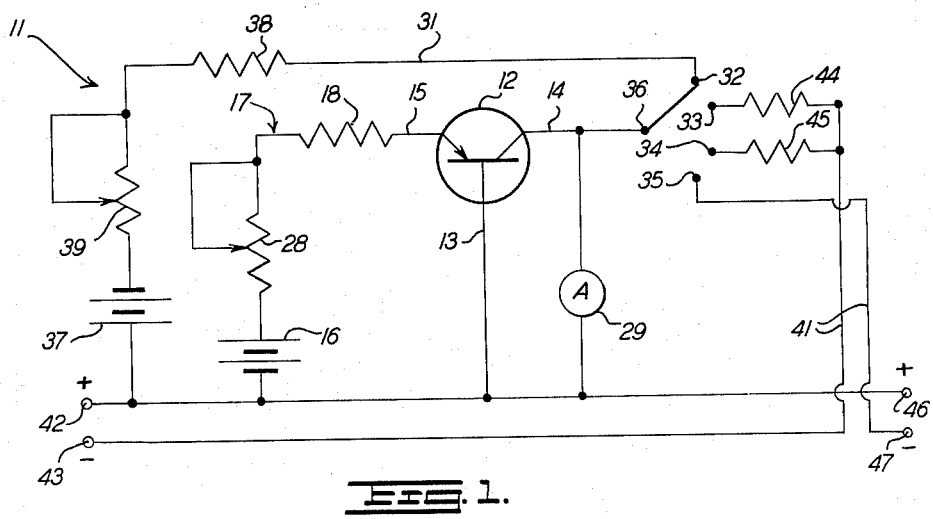
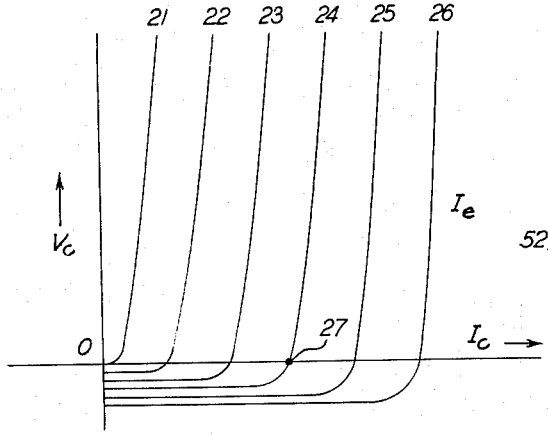
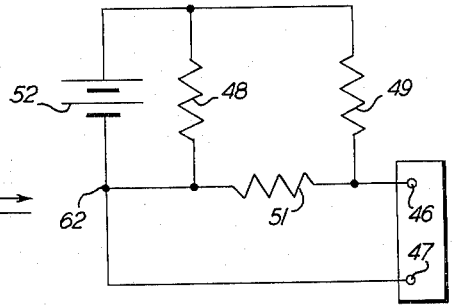
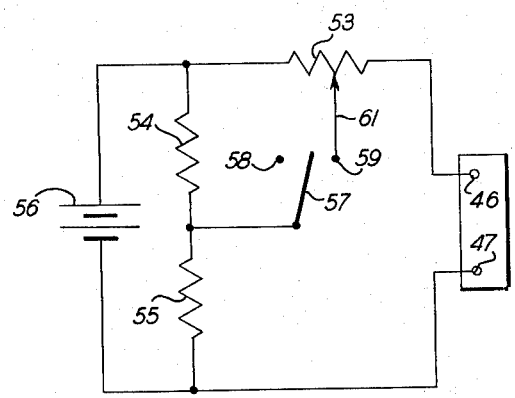
INVENTOR
EVANDER K. FULLER
BY R. P. Miller
ATTORNEY

United States Patent Office 3,204,179
Patented Aug. 31, 1965

3,204,179
TEST CIRCUIT FOR DETERMINING IMPEDANCE AND RELATED CHARACTERISTICS OF AN ELECTRICAL ELEMENT INCLUDING TRANSISTOR MEANS OPERATED WITH ZERO COLLECTOR-TO-BASE VOLTAGE
Evander K. Fuller, Greensboro, N.C., assignor to Western Electric Company, Incorporated, New York, N.Y., a corporation of New York
Filed Nov. 25, 1959, Ser. No. 855,459
9 Claims. (Cl. 324—57)

This invention relates to a test circuit for determining the characteristics of electrical elements and more particularly to a semiconductor device for measuring impedance, voltage output, and current output of various electrical elements.

In the complex electrical equipment used today it is of prime importance that the resistance value, current output, or voltage output of various electrical elements or components be known within precise limits. Heretofore electrical test circuits or devices used to make measurements on these electrical components have produced data which involved a rather large percent of error. For example, in some cases the measured resistance value of a resistor was accurate to within ±5 percent of the indicated value and such a great error is highly undesirable. The instant invention, utilizing a semiconductor, can make measurements such as those measurements mentioned above and can produce data which is accurate within ±.05 percent of the indicated values.

It is an object of the present invention to provide a new and improved test circuit for determining the characteristics of electrical elements.

It is another object of the invention to provide a test circuit for measuring the impedance of an electrical element by utilizing the characteristics of a semiconductor device.

It is still a further object of this invention to measure the impedance of an electrical component by utilizing a transistor as a comparison standard.

It is another object of this invention to provide an electrical measuring device utilizing a transistor and operating the transistor at zero collector-to-base voltage.

It is a further object of the present invention to provide a new and improved means for determining the resistance ratio of one resistance component with respect to a second resistance component by utilizing the characteristics of a semiconductor device wherein a major portion of a current is applied through the transistor and the remaining portion is applied through a measuring instrument.

With these and other objects in view, the present invention contemplates the use of a transistor biased to operate at zero collector-to-base voltage. A voltage source for biasing the emitter electrode in the forward direction with respect to the base electrode and a variable resistor are employed to set the transistor at an operating condition such that only a fixed value of collector current will flow through the transistor at zero collector-to-base voltage. A test component-containing circuit having a voltage source interconnects the base and collector and applies a current signal from the test component to the collector. The portion of the current signal, which does not flow through the transistor as collector current, flows through an ammeter interconnecting the base and collector. The currrent flow in the ammeter indicates the magnitude of a characteristic of the electrical component under test.

Other objects and advantages of the invention will become apparent by reference to the following detailed description when considered in conjunction with the accompanying drawings, wherein:

FIG. 1 is a schematic diagram of a test circuit which is used to make measurements of various electrical components in accordance with the principles of the present invention;

FIG. 2 is a graph plotting collector voltage against collector current showing the static characteristics of a semiconductor used in the test circuit of FIG. 1;

FIG. 3 is a schematic diagram of a system of impedance elements of which measurement may be taken by the use of the test circuit illustrated in FIG. 1; and FIG. 4 is a schematic diagram of two series impedance elements, the ratio of which can be determined by the use of the circuit illustrated in FIG. 1.

Referring to FIG. 1, there is shown schematically a semiconductor network 11 having a common base configuration. The semiconductor network consists of a semiconductor, such as an PNP transistor 12, having base, collector, and emitter electrodes, respectively, indicated by the numerals 13, 14, and 15. A suitable source 16 of biasing potential for operation of the transistor, preferably a mercury battery, is placed in an emitter-base circuit, generally designated by numeral 17. For the illustrated PNP transistor, the biasing potential is connected to provide a forward direct bias for the emitter 15. Resistor 18, in FIG. 1, is placed in the emitter-base circuit 17 and acts as a current control for the emitter. With a fixed biasing potential, the emitter current $I_e$ may be changed by merely changing the size of resistor 18. Changing the size of resistor 18 is accomplished by and one of several well-known methods, such as using a bank of resistors with a suitable switching arrangement.

When a particular resistance value for resistor 18 is chosen, the current which will flow in the emitter 15 is illustrated by the characteristic curve 24 of FIG. 2. It will be observed that each curve of FIG. 2 represents a different value of emitter current $I_e$ and the emitter current is constant along any individual curve; therefore, selection of a particular resistance value for resistor 18 is in effect a selection of a particular characteristic curve of the transistor. The abscissa and ordinate of the graph in FIG. 2 represent collector current $I_c$ and collector voltage $V_c$, respectively. At a particular value of emitter current, and with zero voltage between collector and base, also referred to as collector voltage $V_c$, a collector current of the magnitude indicated by point 27 on the graph will flow through the collector 14. It is apparent that the intersection of the emitter current curve 24 with the abscissa representing collector current $I_c$ at zero collector voltage $V_c$ determines the collector current $I_c$ which will flow in the collector and hence the selection of resistor 18 determines the collector current $I_c$ which will flow. The emitter-base circuit 17 is therefore the circuit which controls the operating condition of the transistor. A second variable resistor 28 is placed in the emitter-base circuit 17 to provide a more accurate control of the emitter current $I_e$.

An ammeter 29 is connected between the collector 14 and base 13. When the emitter current has been determined by a proper selection of resistor 18 to give a precise amount of collector current $I_c$ at zero collector-to-base voltage, as observed at point 27 on the graph of FIG. 2, ammeter 29 will give a zero reading. The zero reading on ammeter 29 will occur at zero collector-to-base voltage, with a value of collector current $I_c$ represented by point 27 since under these precise conditions the semiconductor acts effectively as a component having zero resistance between the base and collector junctions, and, consequently, no voltage is developed between the base and collector electrodes by the collector current $I_c$. Since the semiconductor acts as a zero resistance under these precise conditions, no current will flow through the ammeter 29. The above-described condition of the semiconductor is the operating condition to which signals of unknown value will be compared.

Since semiconductors tend to be very sensitive to atmospheric conditions, the characteristic curve of the semiconductor will have a tendency to drift. Referring to the graph in FIG. 2, if some atmospheric condition affects the semiconductor, the curves 21 through 26, inclusive, may shift either to the left or to the right along the abscissa, thus a selection of a particular resistor 18 to give a certain emitter current $I_e$ will not always give the same precise value of collector current $I_c$ at zero collector-to-base voltages, and, consequently, the zero position on the ammeter will have no meaning since the collector current $I_c$ will change and thus change the operating condition of the semiconductor. To correct for the instability of the semiconductor, a calibration circuit generally designated by numeral 31 is provided. The calibration circuit 31 interconnects the base 13 and the collector 14 through terminal 32 of switch 36. An electrical potential source 37, preferably a mercury battery, provides the energy to properly calibrate the test system. Resistor 38 of FIG. 1 is a current limit resistor, similar in physical construction to resistor 18 of the emitter base circuit, and is used to control the amount of calibration current which flows to the collector 14 from the calibration circuit. To calibrate the test system a particular resistance value is selected for resistor 38. If this resistance is too small, more current will be allowed to flow in the collector base circuit than the operating condition of the semiconductor will accept, and any current in excess of that represented by point 27 on the graph of FIG. 2 will not flow through the collector-base junction but will be forced to flow through ammeter 29. The value of resistor 38 can be increased until the ammeter 29 reads zero. The collector current $I_c$ flowing at zero collector-to-base voltage, as represented by point 27 on the graph of FIG. 2, can be ascertained from the known values of resistor 38 and voltage source 37. When the collector current $I_c$ is determined, the operating condition of the semiconductor can be used as a reference for ascertaining the magnitude of unknown current signals. If resistor 38 is too large when initially selected for calibration purposes, the ammeter will read down-scale and the value of resistor 38 can merely be changed until the precise operating condition is determined as described above. Variable resistor 39 is used to allow more precise current control of the calibration circuit.

The test component-containing circuit is generally designated by numeral 41. The circuit is interconnected between the base 13 and collector 14 through switch 36. Terminals 42 and 43 of FIG. 1 are voltage input terminals which are used while measuring the magnitude of a voltage source or for making certain resistance measurements. Resistance 44 is a standard resistance across which the voltage of the source under test will be developed. Resistor 44 is also used as a resistance standard against which a test resistor, illustrated by resistor 45, may be compared. Terminals 46 and 47 are current input terminals which can be used for measuring the magnitude of current sources and for making certain other resistance measurements. A separate set of terminals 46 and 47 is provided for measuring a current source since a resistance-free circuit for measuring a current source is desirable.

The test circuit introduces a signal from a component under test, such as resistor 45, to the collector 14 through an appropriate terminal of the switch 36. The signal, represented by current from the test component, is compared to the precise amount of current which will flow in the collector 14 under the calibrated operating condition. Since the signal current will be greater than the value of collector current $I_c$ at the precise operating condition, as represented by point 27 of the graph in FIG. 2, and since the semiconductor will resist a collector current flow in excess of this precise collector current, the excess current flow from the test component will flow through ammeter 29. The differential current which is forced to flow through and be recorded by ammeter 29 is proportional to and indicates the magnitude of the electrical characteristic under test. A description of general and specific operations of the test system is set forth below.

*General operation*

In a situation where a voltage source in the range of 100 v. to 105 v. is to be tested, the voltage source is connected to terminals 42 and 43. A resistance value for resistor 18 is selected to operate the semiconductor on a characteristic curve which will produce a collector current somewhere in the range of the signal current which will be received from the voltage source under test. The semiconductor is now in the operating condition with zero collector-to-base voltage and with a precise amount of collector current. Next the test system is calibrated to ascertain the amount of collector current which will flow at the operating condition. Switch 36 is set to terminal 32 which places the calibration circuit 31 in the collector-base circuit. A resistance value for resistor 38 is selected to permit a precise amount of current to flow in the collector and produce a zero reading on the ammeter as described above. Switch 36 is next turned to terminal 33, thereby switching the calibration circuit 31 out of operation and connecting the test circuit to the collector 14. A voltage source of unknown value is connected to terminals 42 and 43 and it produces a signal current through a standard known resistance 44. This signal current will attempt to flow in the collector-base circuit with the semiconductor set in the calibrated operating condition. Since the semiconductor will accept no more than a precise amount of collector current in the operative condition, the excess signal current will be forced to flow through ammeter 29. Ammeter 29 indicates a difference which exists between the signal current flow and the precise collector current $I_c$ which will be allowed to flow in the collector when the semiconductor is in the calibrated operating condition. Since the magnitude of the voltage source is directly proportional to the current produced through a standard resistor, the differential current reading on the ammeter is an indication of the magnitude of the voltage source under test. In this case the ammeter reading may indicate that the voltage source is actually 102 v.

If a known voltage is used in the place of the unknown voltage, the resistance value of a resistor may be measured by replacing the standard resistor 44 with the unknown resistance. The resulting signal current flow through the unknown resistance will be proportional to the resistance of the resistor and the magnitude of the unknown resistance can then be determined in the same manner that the voltage value of the unknown voltage source was determined. Also, by using both a standard resistance 44 and a standard voltage connected to terminals 42 and 43, the test system may be used as a means of individually comparing a group of resistors of unknown resistance values, represented by resistor 45, with the known standard resistor 44. To make such a test, the test system is calibrated in the usual manner or the calibration procedure may be avoided since this is a direct comparison of resistance value, and a test reading of the signal from the standard resistor is taken from the ammeter 29. One of the unknown resistances 45 is then switched into the system through terminal 34 of switch 36 and an ammeter reading for the unknown resistor is compared with the reading produced by the current signal from the standard resistor. The percent variation of the unknown resistance from the known resistance is obtained from a comparison of the two ammeter readings.

Current comparisons may be made by connecting an unknown current source to terminals 46 and 47. The current signal from the unknown current source is directly compared to the previously calibrated operating condition of the semiconductor by applying the current signal to the collector 14 through terminal 35 of switch 36. The reading on the ammeter 29 will indicate the current output of the current source. Separate input current terminals 46 and 47 are used since no resistance is desired in the input for measuring a current source.

Specific applications

In addition to the general applications recited above, the test system will now be described in combination with several specific electrical networks, the electrical characteristics of which may be determined. Referring to FIG. 3, there is shown three resistors 48, 49, and 51 connected in a triangular fashion. If the resistance value of resistor 49 is to be measured without removing the resistor from the circuit, the terminals 46 and 47 of FIG. 3 can be connected to the terminals of the same number in FIG. 1. A potential source 52 is used to energize the resistors 48, 49, and 51, and to provide a current signal from the test resistor 49. Resistors 48 and 51 of the parallel circuit will not affect the measurement since both resistors are connected to the negative side of the potential source at point 62 and therefore no current which is flowing in the test system will flow through resistors 48 and 49.

When collector current $I_c$ is flowing, the test system represents zero resistance as previously noted and all the test current will flow through the resistor 49 under test. The differential current value registered on the ammeter, as previously described, can be compared to the differential current flow through a standard known resistance 44, thus the resistance of resistor 49 can be ascertained without removing it from the circuit in which it is connected. Although the test device can be calibrated for this test, it is not essential since the measurement involves a comparison with a standard other than the test device itself.

The test system can also be used as a ratio detector. Referring to FIG. 4, there is shown a calibrated potentiometer 53 and a pair of resistors 54 and 55 of unknown resistance magnitude. The unknown resistors 54 and 55 are placed in series with the potentiometer and in parallel with a voltage source 56. This circuit is then connected to terminals 46 and 47 of the test system in FIG. 1. A switch 57 is opened to position 58 to take the series resistors 54 and 55 out of the test system. The ammeter 29 is calibrated to read zero with the current which flows through the potentiometer 53 as a result of voltage source 56. When switch 57 is moved to position 59, thereby placing resistor 54 in parallel with the potentiometer 53, the signal current which flows through the potentiometer 53 and consequently the current which flows in the test system, will be changed in relation to the magnitude of the resistance value of resistor 54. Ammeter 29 will indicate this change in the current flow. The potentiometer 53 can be adjusted until the ammeter 29 again registers zero. When the ammeter 29 is re-zeroed, current flow from the test circuit will be the same as when the resistor 54 was not in parallel with the potentiometer 53. The adjustment made on the potentiometer 53 will indicate the resistance ratio of resistor 54 with respect to resistor 55 since the ratio of the resistance value between the potentiometer control 61 and a first end of the potentiometer to the resistance value between the resistance control 61 and the second end of the potentiometer represents the resistance ratio of resistor 54 to resistor 55.

It is to be understood that the above-described arrangement of apparatus and components and construction of elemental parts are simply illustrative of the application of the principles of the invention, and many other modifications may be made without departing from the invention.

What is claimed is:
1. In a test circuit for determining a characteristic of an electrical element; a transistor having a base, emitter, and collector; said transistor biased to conduct a predetermined current; means for operating the transistor with zero collector-to-base voltage condition across said transistor; a circuit having an ammeter interconnecting the collector and the base; means for applying current to the electrical element; and means for applying the current passing through the electrical element to said collector and base whereby said transistor passes said predetermined amount of current and the remaining current passes through said ammeter.

2. In a test circuit for determining a characteristic of an electrical element; a transistor having a base, emitter, and collector; means for biasing the transistor to operate with zero collector-to-base voltage condition across said transistor; a circuit having an ammeter interconnecting the collector and the base, a calibration circuit selectively interconnecting said collector and base; means for adjusting said calibration circiut so that a predetermined current flows through said transistor; means for disconnecting said calibration circuit and for applying current to the electrical element; and means for applying the current passing through the electrical element to said collector and base whereby said current in excess of said predetermined current is passed through said ammeter.

3. A test system for measuring the resistance of an electrical component which comprises a transistor having emitter, collector, and base electrodes; a current limit resistor connected to the emitter electrode; a voltage source connected between the resistor and the base electrode for biasing the emitter in the forward direction with respect to the base electrode; said current limit resistor and voltage source adapted to condition the transistor to operate at fixed values of emitter and collector current flow with a zero collector-to-base voltage across said transistor; a switch connected to the collector electrode; means for applying a test current to the electrical component; a test component-containing circuit interconnecting the base and collector electrodes for applying the test current from the test component through said switch to said transistor; and an ammeter connected between the collector and base electrodes for indicating the magnitude of the test current in excess of the collector current.

4. In a test device for determining a characteristic of a electrical element by measuring current flow; a transistor having base, emitter, and collector electrodes; a current limit resistor connected to the emitter electrode; a first voltage source connected between said current limit resistor and the base electrode for biasing the emitter in the forward direction with respect to the base electrode, said current limit resistor and voltage source adapted to condition the transistor to operate at predetermined collector and emitter currents with a zero collector-to-base voltage; a multi-terminal switch connected to the collector electrode; a calibration circuit interconnecting the base and collector electrodes through a first terminal of said switch for operating said transistor with a predetermined current at a zero collector-to-base voltage condition across said transistor; a second voltage source for supplying a current signal to the electrical element; a test component-containing circuit for applying the current signal from the electrical element through a second terminal of the switch to the collector and base electrodes; and an ammeter connected between the collector and the base electrodes for indicating the current signal in excess of said collector current.

5. In a test device for measuring the resistance of an electrical component connected in a parallel network; a transistor having base, emitter, and collector electrodes; means for operating the transistor with a predetermined current at a zero collector-to-base voltage condition across said transistor; means for supplying a signal current to the parallel network; means for interconnecting the network between the collector and base electrodes whereby the part of the signal current flowing through the electrical component is applied to the collector; and means interconnecting the collector and base for indicating the magnitude of signal current in excess of the predetermined current.

6. A test device utilizing a potentiometer for determining the ratio of two series connected resistors which comprises a transistor having emitter, collector, and base electrodes; means for operating the transistor with a predetermined current at a zero collector-to-base voltage condition across said transistor; means for supplying a test current to said potentiometer; means for applying the current signal from the potentiometer to the collector and base electrodes; an ammeter interconnected between said collector and base for indicating a reference current indicative of the difference between said predetermined current and said test current; means for selectively interconnecting the potentiometer and one of said series resistors in parallel to alter the current passing through the ammeter; and means for adjusting said potentiometer until said current passing through ammeter is again equal to said reference current whereby the amount of adjustment of said potentiometer is representative of ratio of said series resistors.

7. A ratio detector system for determining the ratio of two series connected resistors which comprises a transistor having emitter, collector, and base electrodes; a first voltage source interconnecting the base and emitter electrodes for biasing and conditioning the transistor to operate with predetermined values of emitter and collector current flow at a zero collector-to-base voltage condition across said transistor; a potentiometer connected to the collector electrode; a second voltage source connected to the potentiometer for operating said transistor with said predetermined collector current; an ammeter connected between the collector and base electrodes for indicating a zero reading when the predetermined collector current flows; a switch for placing one of the series resistors in parallel with the potentiometer and the second series resistor in parallel with the collector and base electrodes whereby the current flow in the potentiometer is changed; said ammeter indicating the change in potentiometer current; and means for adjusting the potentiometer to re-zero the ammeter whereby the amount of adjustment is indicative of the ratio of the series resistances.

8. In a test circuit for determining a characteristic of an electrical element, a semiconductor, means for biasing the semiconductor to conduct only a predetermined current and for setting the operating characteristics of the semiconductor to present zero resistance for said predetermined current flow, a current indicating means connected in parallel with said semi-conductor means connected to the electrical element for developing a test current, and means for applying the test current to the semiconductor whereby said test current in excess of said predetermined current will flow through said current indicating means.

9. In a test circuit for determining a characteristic of an electrical element; a transistor having a base, emitter, and collector; means for biasing the transistor to conduct predetermined emitter and collector currents at which the collector-to-base junction effectively demonstrates a zero resistance, a circuit including an ammeter interconnecting the collector and the base; means for applying current to the electrical element; and means for applying the current passing through the said electrical element to said collector across said collector-to-base junction whereby said transistor passes said predetermined collector current and the remaining current passes through said ammeter.

References Cited by the Examiner

UNITED STATES PATENTS

| 1,964,141 | 6/34 | Rhodes et al. | 324—57 |
| 2,595,208 | 4/52 | Bangert | 324—158 |
| 2,677,102 | 4/54 | Young | 324—62 |
| 2,783,435 | 2/57 | Wilhelm | 324—62 X |
| 2,824,283 | 2/58 | Ellison | 324—62 X |
| 2,891,219 | 6/59 | Camp | 324—62 |
| 3,099,827 | 7/63 | Wu | 330—2 X |

FOREIGN PATENTS

| 810,665 | 3/59 | Great Britain. |

OTHER REFERENCES

Young publication: "A Comparator for Precise Transfer Conductance Measurements," Bell Laboratories Record, November 1954, pages 427–430.

"IRE Standards on Methods of Testing Transistors," Proceedings of the IRE, volume 44, No. 11, November 1956, pages 1543–1561.

Street: "Simple Circuit Measures Power Supply Impedances," Electronics, pages 206 and 208, June 1956.

Turner: "Test Techniques for Transistors," Radio-Electronics, March 1953, pages 78–84.

WALTER L. CARLSON, *Primary Examiner.*

SAMUEL BERNSTEIN, *Examiner.*